(12) United States Patent
Dostert et al.

(10) Patent No.: US 7,810,075 B2
(45) Date of Patent: Oct. 5, 2010

(54) COMMON TRACE FILES

(75) Inventors: Jan Dostert, Nussloch (DE); Frank Kilian, Mannheim (DE)

(73) Assignee: SAP AG, Walldorf (DE)

( * ) Notice: Subject to any disclaimer, the term of this patent is extended or adjusted under 35 U.S.C. 154(b) by 802 days.

(21) Appl. No.: 11/118,208

(22) Filed: Apr. 29, 2005

(65) Prior Publication Data

US 2006/0248177 A1 Nov. 2, 2006

(51) Int. Cl.
*G06F 9/44* (2006.01)

(52) U.S. Cl. .................. 717/128; 717/124; 717/125; 717/127; 717/130; 717/131

(58) Field of Classification Search .................. 717/128, 717/124, 125, 127, 130, 131, 158; 712/227; 702/187; 714/38, 27
See application file for complete search history.

(56) References Cited

U.S. PATENT DOCUMENTS

| | | | |
|---|---|---|---|
| 5,201,044 A | 4/1993 | Frey et al. | |
| 5,608,720 A | 3/1997 | Biegel et al. | |
| 5,748,963 A | 5/1998 | Orr | |
| 5,944,841 A * | 8/1999 | Christie | 714/38 |
| 6,026,237 A | 2/2000 | Berry et al. | |
| 6,055,492 A * | 4/2000 | Alexander et al. | 714/27 |
| 6,061,721 A | 5/2000 | Ismael et al. | |
| 6,083,281 A | 7/2000 | Diec et al. | |
| 6,118,940 A | 9/2000 | Alexander, III et al. | |
| 6,144,967 A | 11/2000 | Nock | |
| 6,202,199 B1 * | 3/2001 | Wygodny et al. | 717/128 |
| 6,230,313 B1 * | 5/2001 | Callahan et al. | 717/128 |
| 6,260,187 B1 | 7/2001 | Cirne | |
| 6,308,208 B1 | 10/2001 | Jung et al. | |
| 6,356,931 B2 | 3/2002 | Ismael et al. | |
| 6,381,735 B1 | 4/2002 | Hunt | |
| 6,470,388 B1 | 10/2002 | Niemi et al. | |
| 6,539,501 B1 | 3/2003 | Edwards | |
| 6,553,403 B1 | 4/2003 | Jarriel et al. | |
| 6,560,618 B1 | 5/2003 | Ims | |
| 6,567,809 B2 | 5/2003 | Santosuosso | |
| 6,631,515 B1 | 10/2003 | Berstis | |
| 6,658,600 B1 | 12/2003 | Hogdal et al. | |
| 6,662,359 B1 | 12/2003 | Berry et al. | |
| 6,681,232 B1 | 1/2004 | Sistanizadeh | |

(Continued)

FOREIGN PATENT DOCUMENTS

JP     2001195151     7/2001

(Continued)

OTHER PUBLICATIONS

Burtscher, et al. "Automatic Generation of High-Performance Trace Compressors", 2005, IEEE, p. 1-12.*

(Continued)

*Primary Examiner*—Wei Y Zhen
*Assistant Examiner*—Qamrun Nahar
(74) *Attorney, Agent, or Firm*—Blakely, Sokoloff, Taylor & Zafman LLP

(57) ABSTRACT

A method and system for generating common trace files for multiple components. In one embodiment, separate trace information is received from multiple components. The separate trace information received from multiple components is integrated into a single common trace file to provide common trace information for multiple components.

12 Claims, 11 Drawing Sheets

U.S. PATENT DOCUMENTS

| | | | |
|---|---|---|---|
| 6,708,173 B1* | 3/2004 | Behr et al. | 717/128 |
| 6,738,933 B2 | 5/2004 | Fraenkel et al. | |
| 6,754,890 B1* | 6/2004 | Berry et al. | 717/128 |
| 6,772,178 B2 | 8/2004 | Mandal et al. | |
| 6,789,257 B1 | 9/2004 | MacPhail | |
| 6,802,067 B1 | 10/2004 | Camp et al. | |
| 6,834,301 B1 | 12/2004 | Hanchett | |
| 6,836,878 B1 | 12/2004 | Redpath et al. | |
| 6,851,112 B1 | 2/2005 | Chapman | |
| 6,851,118 B1 | 2/2005 | Ismael et al. | |
| 6,857,119 B1 | 2/2005 | Desai | |
| 6,862,711 B1 | 3/2005 | Bahrs et al. | |
| 6,880,125 B2 | 4/2005 | Fry | |
| 6,895,578 B1 | 5/2005 | Kolawa et al. | |
| 6,922,417 B2* | 7/2005 | Vanlint | 702/187 |
| 6,925,631 B2 | 8/2005 | Golden | |
| 6,934,942 B1 | 8/2005 | Chilimbi | |
| 6,961,918 B2 | 11/2005 | Garner et al. | |
| 6,968,540 B2 | 11/2005 | Beck et al. | |
| 6,985,848 B1 | 1/2006 | Swoboda et al. | |
| 6,990,601 B1 | 1/2006 | Tsuneya et al. | |
| 7,000,235 B2 | 2/2006 | Mandal et al. | |
| 7,017,051 B2 | 3/2006 | Patrick | |
| 7,017,162 B2 | 3/2006 | Smith et al. | |
| 7,024,474 B2 | 4/2006 | Clubb et al. | |
| 7,051,324 B2 | 5/2006 | Gissel et al. | |
| 7,058,558 B2 | 6/2006 | Reichenthal | |
| 7,062,540 B2 | 6/2006 | Reddy et al. | |
| 7,069,267 B2 | 6/2006 | Spencer, Jr. | |
| 7,082,604 B2* | 7/2006 | Schneiderman | 709/202 |
| 7,086,065 B1 | 8/2006 | Yeluripati et al. | |
| 7,093,234 B2 | 8/2006 | Hibbeler et al. | |
| 7,120,685 B2 | 10/2006 | Ullmann et al. | |
| 7,131,113 B2* | 10/2006 | Chang et al. | 717/128 |
| 7,146,544 B2 | 12/2006 | Hsu et al. | |
| 7,152,104 B2 | 12/2006 | Musante et al. | |
| 7,174,370 B1 | 2/2007 | Saini et al. | |
| 7,200,588 B1 | 4/2007 | Srivastava et al. | |
| 7,206,827 B2 | 4/2007 | Viswanath et al. | |
| 7,240,334 B1 | 7/2007 | Fluke et al. | |
| 7,251,809 B2 | 7/2007 | Barclay et al. | |
| 7,305,671 B2 | 12/2007 | Davidov et al. | |
| 7,475,401 B1 | 1/2009 | Frey et al. | |
| 2002/0029298 A1 | 3/2002 | Wilson | |
| 2002/0073063 A1 | 6/2002 | Faraj | |
| 2002/0170036 A1 | 11/2002 | Cobb et al. | |
| 2003/0005173 A1 | 1/2003 | Shah et al. | |
| 2003/0110252 A1 | 6/2003 | Yang-Huffman | |
| 2003/0120593 A1 | 6/2003 | Bansal et al. | |
| 2003/0135556 A1 | 7/2003 | Holdsworth | |
| 2003/0167304 A1 | 9/2003 | Zhu et al. | |
| 2003/0225872 A1 | 12/2003 | Bartek et al. | |
| 2004/0022237 A1 | 2/2004 | Elliott et al. | |
| 2004/0028059 A1 | 2/2004 | Josyula et al. | |
| 2004/0031020 A1 | 2/2004 | Berry et al. | |
| 2004/0060043 A1 | 3/2004 | Frysinger et al. | |
| 2004/0123279 A1 | 6/2004 | Boykin et al. | |
| 2004/0148356 A1 | 7/2004 | Bishop et al. | |
| 2004/0148610 A1 | 7/2004 | Tsun et al. | |
| 2004/0154011 A1* | 8/2004 | Wang et al. | 717/158 |
| 2004/0158837 A1 | 8/2004 | Sengodan | |
| 2004/0230973 A1 | 11/2004 | Cundiff et al. | |
| 2004/0237093 A1 | 11/2004 | Sluiman et al. | |
| 2004/0249613 A1 | 12/2004 | Sprogis et al. | |
| 2004/0268314 A1 | 12/2004 | Kollman et al. | |
| 2005/0028171 A1 | 2/2005 | Kougiouris et al. | |
| 2005/0033777 A1 | 2/2005 | Moraes et al. | |
| 2005/0038889 A1 | 2/2005 | Frietsch | |
| 2005/0039171 A1 | 2/2005 | Avakian et al. | |
| 2005/0039187 A1 | 2/2005 | Avakian et al. | |
| 2005/0097110 A1 | 5/2005 | Nishanov et al. | |
| 2005/0102536 A1 | 5/2005 | Patrick et al. | |
| 2005/0132337 A1 | 6/2005 | Wedel et al. | |
| 2006/0095674 A1* | 5/2006 | Twomey | 712/227 |
| 2007/0156656 A1 | 7/2007 | Pather et al. | |

FOREIGN PATENT DOCUMENTS

| | | |
|---|---|---|
| JP | 200208277 | 3/2002 |
| JP | 2002073522 | 3/2002 |
| WO | WO-0205102 | 1/2002 |
| WO | WO-0241154 | 5/2002 |

OTHER PUBLICATIONS

Kaplan, et al. "Flexible Reference Trace Reduction for VM Simulations", 2003, ACM, p. 1-38.*

Burtscher, M. "VPC3: A Fast and Effective Trace-Compression Algorithm", 2004, ACM, p. 167-176.*

Wu, et al. "From Trace Generation to Visualization: A Performance Framework for Distributed Parallel Systems", 2000, IEEE, p. 1-18.*

"EarlyAdopter_DS.pdf, Bibliographic Data for "Early Adopter: J2SE 1.4"", by Wrox Press 1 pg, 2001.

"Debugging J2EE Applications", Sun Microsystems, Java—J2EE 1.4 Application Server Deveoper's Guide, "Debugging J2EE Applications" Chapter 4, http://java.sun.com/j2ee/1.4 docs/devguide/dgdebug.html, 2003, printed Jul. 2, 2004 (11 pgs.).

"How Introscope Works", Wily Technology, Inc., Wily Solutions "How Introscope Works"—Enterprise Application Mangement, http://www.wilytech.com/solutions/products/howWorks.html, 1999-2004, printed Jul. 2, 2004 (1 page).

"Java Logging Overview", (Nov. 2001), pp. 1-9.

"Jikes Bytecode Toolkit: Overview", Alphaworks, www.alphaworks.ibm.com/tech/jikesbt, posted Mar. 31, 2000, 2 pages, printed Sep. 28, 2006.

"Mobile-Code Security Mechanisms for Jini", Mobile-Code Security Mechanisms for Jini—"Mobile-Code Security Mechanisms for Jini" Download code, DISCEX 2001 Paper, http://theory.stanford.edu/people/jcm/software/jinifilter.html, printed Jul. 2, 2004—(3 pgs.), (2001).

"Package Gnu.Bytecode", Package Gnu.Bytecode, http://sources.redhat.com/kawa/api.qnu/bytecode/packaqe-summary.html, 4 pages, printed Sep. 28, 2006.

"The Java Object Instrumentation Environment", Duke University, 2003.

"The Wily 5 Solution—Enterprise Aplications are Your Business", Wily Technology, Inc., Wily Techonology, Inc., Wily Solutions "The Wily 5 Solution—Enterprise Aplications are Your Business", http://www.wilytech.com/solutions/ibm_family.html, 1999-2004, printed Jul. 2, 2004 (2 pgs.).

"Wily Introscope", Wily Technology, Inc., Wily Solutions "Wily Introscope"—Enterprise Application Management, http://www.wilytech.com/solutions/products/Introscope.html, 1999-2004, printed Jul. 2, 2004 (2 pgs.).

Affeldt, Reynald, et al., "Supporting Objects in Run-Time Bytecode Specialization", Reynald Affeldt, et al., "Supporting Objects in Run-Time Bytecode Specialization", Department of Graphics and Computer Science, University of Tokyo, ASIA-PEPM '02, Sep. 12-17, 2002, ACM, pp. 50-60., 50-60.

Chander, Ajay, et al., "Mobile Code Security by Java Bytecode Instrumentation", Ajay Chander et al., "Mobile Code Security by Java Bytecode Instrumentation", Proceedings of the DARPA Information Survivability Conference & Exposition DISCEX-II 2001, Jun. 12-14, 2001, Stanford University and University of Pennsylvania, [*Partially suppo, 14 pgs.

Cohen, Geoff A., et al., "An Architecture for Safe Bytecode Insertion", Geoff A. Cohen, et al., Software-practice and Experience, [Version: Mar. 6, 2000 v2.1] "An Architecture for Safe Bytecode Insertion", Department of Computer Science, Duke University (27 pgs.), (Mar. 6, 2000).

Dahm, Markus, "Welcome to the Byte Code Engineering Library 4.4.1", http://bcel.sourceforge.net/main.html, last updated Apr. 12, 2002, 2 pages, printed Sep. 28, 2006.

Davies, Jonathan, et al., "An Aspect Oriented performance Analysis Environment", Jonathan Davies, et al., Proceedings of the 2nd international conference on "An Aspect Oriented Performance Analysis Environment", 10 pgs., 2003, Boston, Massachusetts Mar. 17-21, 2003.

Gagnon, Etienne, et al., "Effective Inline-Threaded Interpretation of Java Bytecode Using Preparation Sequences", Etienne Gagnon, et al., "Effective Inline-Threaded Interpretation of Java Bytecode Using Preparation Sequences", *Sable Research Group, Universite du Quebec a Montreal and McGill University*, Montreal. Canida, Jan. 23, 2003 (15 pgs.).

Gill, Peter W., "Probing for a Continued Validation Prototype", Peter W. Gill, "Probing for a Continued Validation Prototype", *a Thesis Submitted to the Faculty of the Worcester Polytechnic Institute*, May 2001, (111 pages).

Goldberg, Allen, et al., "Instrumentation of Java Bytecode for Runtime Analysis", Allen Goldberg, et al., "Instrumentation of Java Bytecode for Runtime Analysis", *Fifth ECOOP Workshop on Formal Techniques for Java-like Programs*, Jul. 21, 2003, *Kestrel Technology*, NASA Ames Research Center, Moffett Field, California USA, (9 pgs.).

Keller, Ralph, et al., "Supporting the Integration and Evolution of Components Through Binary Component Adaptation", www.cs.ucsb.edu/oocsb, Sep. 9, 1997, *Technical Report TRCS97-15*, 12 pages.

Lee, Han B., "BIT: Bytecode Instrumenting Tool", *University of Colorado, Department of Computer Science 1997*, 51 pages.

Lee, Han B., et al., "BIT: A Tool for Instrumenting Java Bytecodes", Han Bok Lee, et al., "BIT: A Tool for Instrumenting Java Bytecodes", originally published in the *Proceedings of the USENIX Symposium on Internet Technologies and Systems*, Monterey, California, Dec. 1997, www.usenix.org/ (11 pgs.).

Li, Wen, et al., "Collaboration Transparency in the Disciple Framework", Wen Li, et al., "Collaboration Transparency in the Disciple Framework", *CAIP Center, Rutgers—The State University of New Jersey, Piscataway, NJ, USA, Proceeding of the ACM International Conference on Supporting Gruop Work (Group '99)* Nov. 14-17, 1999, 10 pgs.

Macrides, Nathan, "SANS Security Essentials (GSEC) Practical Assignment Version 1.4", Nathan Macrides, *Security Techniques for Mobile Code* "SANS Security Essentials (GSEC) Practical Assignment Version 1.4", Jul. 11, 2002, (11 pgs.).

McNamee, Dylan, et al., "Specialization Tools and Techniques for Systematic Optimization of System Software", Dylan McNamee, et al., "Specialization Tools and Techniques for Systematic Optimization of System Software", *Oregon Graduate Institute of Science & Technology, and University of Rennes/IRISA, ACM Transactions on Computer Systems*, 2001 (30 pgs.).

Nikolov, Nikolai, "Classfile Conversion Into An Organization of Objects, and Modification Thereof, to Effect Bytecode Modification", Nikolov, Nikolai, "*Classfile Conversion Into An Organization of Objects, and Modification Thereof, To Effect Bytecode Modification*", U.S. Appl. No. 10/750,396, Office Action mailed Sep. 5, 2006. Offie Action, claims as they stood in the app.

Nikolov, Nikolai, "Execution of Modified Byte Code for Debugging, Testing And/Or Monitoring of Object Oriented Software", Nikolai Nikolov, "*Execution of Modified Byte Code for Debugging, Testing And/Or Monitoring of Object Oriented Software*", U.S. Appl. No. 10/749,617, filed Dec. 30, 2003, Ofice Action mailed Aug. 23, 2006. Office Action, claims as they sto.

Ploesh, Reinhold, "Evaluation of Assertion Support for the Java Programming Language", Reinhold Ploesh, *Johannes Kepler University Linz, Austria*, "Evaluation of Assertion Support for the Java Programming Language", *JOT: Journal of Object Technology, vol. 1, No. 3, Special Issue: Tools USA 2002 Proceedings*, pp. 5-17, http://www.jot.fm/issues/, (2002), 5-17.

Rudys, Algis, et al., "Enforcing Java Run-Time Properties Using Bytecode Rewriting", Algis Rudys, et al., "Enforcing Java Run-Time Properties Using Bytecode Rewriting", *International Symposium on Software Security (Tokyo, Japan)*, Nov. 2002, Rice University, Houston, TX 77005, USA (16 pgs.).

Snyder, Alan, "The Essence of Objects: Concepts and Terms", *IEEE Software*, Jan. 1993, pp. 31-42, Sunsoft, Mountain View.

Welch, Ian, et al., "Kava—A Reflective Java Based on Bytecode Rewriting", Ian Welch, et. al., "Kava—A Reflective Java Based on Bytecode Rewriting" *SpringerLink—Verlag Berling Heidelberg 2000, Chapter, Lectures Notes in Computer Science, W. Cazzola, et al. Editors, Reflection and Software Engineering, LNCS*, pp. 155-167., (2000), 155-167.

Nikolov, Nikolai G., "Byte Code Modification for Testing, Debugging and/or Monitoring of Virtual Machine Based Software", U.S. Appl. No. 10/750,067, filed Dec. 30, 2003—Notice of Allowance dated Nov. 23, 2007.

Nikolov, Nikolai G., "*Classfile Conversion Into an Organization of Objects, and Modification Thereof, to Effect Bytecode Modification*", U.S. Appl. No. 10/750,396, filed Dec. 30, 2003—Notice of Allowance dated Oct. 11, 2007.

Nikolov, Nikolai G., "Execution of Modified Byte Code for Debugging, Testing and/or Monitoring of Object Oriented Software", U.S. Appl. No. 10/749,617, filed Dec. 30, 2003—Final office Action dated Sep. 8, 2008.

Nikolov, Nikolai G., "Interfaces and Methods Employed Within a Bytecode Modification System", U.S. Appl. No. 10/750,160, filed Dec. 30, 2003—Non-Final office Action dated Jun. 10, 2008.

Nikolov, Nikolai G., "Modification and Execution of Bytecode for Debugging, Testing and/or Monitoring of Virtual Machine Based Software", U.S. Appl. No. 10/750,050, filed Dec. 30, 2003—Non-Final office Action dated Nov. 1, 2006.

Nikolov, Nikolai G., "Modified Classified Registration with a Dispatch Unit that is Responsible for Dispatching Invocations During Runtime Execution of Modified Bytecode", U.S. Appl. No. 10/749,740, filed Dec. 30, 2003—Non-Final office Action dated May 13, 2008.

Nikolov, Nikolai G., "Registration Method for Supporting Bytecode Modification", U.S. Appl. No. 10/749,686, filed Dec. 30, 2003—Final office Action dated Jul. 24, 2008.

Nikolov, Nikolai G., "System and Method Employing Bytecode Modification Techniques for Tracing Services Within an Application Server", U.S. Appl. No. 10/750,066, filed Dec. 30, 2003—Non-Final office Action dated Oct. 11, 2007.

Non-Final Office Action for U.S. Appl. No. 10/749,615, Mailed Dec. 23, 2008, 27 pages.

Final Office Action for U.S. Appl. No. 10/749,757, Mailed Apr. 17, 2009, 11 pages.

Non Final Office Action for U.S. Appl. No. 10/749,757, Mailed Oct. 12, 2007, 13 pages.

"Final Office Action for U.S. Appl. No. 10/749,615, Mailed Jul. 16, 2008", 17 pages.

"Final Office Action for U.S. Appl. No. 10/750,044 Mailed Aug. 10, 2007", 9 pages.

"JESE: "Package Java.util.prefs." pp. 1-2 and "Class Preferences" pp. 1-24", (2003).

"Non-Final Office Action for U.S. Appl. No. 10/749,615 Mailed Jan. 17, 2008.", 16 pages.

"Non-Final Office Action for U.S. Appl. No. 10/749,616 Mailed Mar. 27, 2008", 10 pages.

"Non-Final Office Action for U.S. Appl. No. 10/749,616 Mailed Jul. 6, 2007", 11 pages.

"Non-Final Office Action for U.S. Appl. No. 10/749,616 Mailed Jul. 6, 2007", 10 pages.

"Non-Final Office Action for U.S. Appl. No. 10/749,757 Mailed Oct. 12, 2007", 12 pages.

"Non-Final Office Action for U.S. Appl. No. 10/750,044 Mailed Feb. 6, 2008", 6 pages.

"Non-Final Office Action for U.S. Appl. No. 10/750,044 Mailed Jan. 16, 2007", 9 pages.

"The Document Object Model Parsing Documents with a DOM Parser", www.cafeonleche.org/books/xmljava/chapters_ch09x06.html Chapter 9, "*The Document Object Model Parsing Documents with a DOM Parser*", 2001, 2002, pp. 1-10.

"The Document Object Model, Trees", www.cafeonleche.org/books/xmljava/chapters/ch09.html *Chapter 9, :The Document Object Model, Trees*, 2001, 2002, pp. 1-10.

"The Doument Object Model DOM Parsers for Java", www.cafeonleche.org/books/xmljava/chaptersch09s05.html *Chapter 9, "The Doument Object Model DOM Parsers for Java"*, 2001, 2002, pp. 1-3.

"The Source for Developers; JAVA Management Extensions (JMX)", Sun Microsystems, Inc. Retrieved from the internet at http://java.sum.com/products/JavaManagement/ Printed Apr. 24, 2004, 2 pages.

"www.cafeonleche.org/book/xmljava.chapters/ch09s09.html", *JAXP Serialization, Chapter 9, The Document Object Model*, (2001, 2002), pp. 1-3.

"www.cafeonleche.org/books/xmljavachapters/ch09.html", *Chapter 9, The Document Object Model*, (2001, 2002), pp. 1-2.

"www.w3.org/TR/DOM-Level-2-Core/introduction.html", *What is the Document Object Model?*, (Nov. 13, 2000), pp. 1-7.

Cohen, Geoff A., et al., "Automatic Program Tranformation with JOIE", *Paper, Departmen of Computer Science*, Duke University, 12 pages., (1998).

Hampton, Kip, "High-Performance XML Parsing with SAX", Published on XML.com by Feb. 14, 2001.

Kegel, Ingo, "Jclasslib bytecode viewer help, ej-technologies GmbH", (08/202003), 8 pages. Retrieved from the internet at file://H:\jclasslib\doc\help.html. Retrieved on Aug. 1, 2007.

Keller, Alexander, "Measuring Application Response Times with the CIM Metrics Model", *IBM e-Business, DSOM 2002, Session 2; Measuring Quality of Service*, Montreal, Canada, (Oct. 22, 2002), 14 pages.

McLaughlin, Brett, "Tip: Set up a SAX Parser", *Published by International Business Machines Corporation on Jul. 2, 2003*.

Shvets, Alexander G., "CafeBabe", (1999), 3 pages.

Stephenson, Ben, et al., "Characterization and Optimization of Java Applications", Ben Stephenson, et al., "Characterization and Optimization of Java Applications" *Department of Computer Science, Abstract in Western Research Forum Program & Abstracts*, p. 20, 2003.

Final Office Action for U.S. Appl. No. 10/749,615, Mailed Jul. 7, 2009, 28 pages.

Non-Final Office Action for U.S. Appl. No. 10/749,757, Mailed Sep. 17, 2009, 10 Pages.

"Log file logging levels", Retrieved from internet archive on Jul. 1, 2009 at: http://web.archive.org/web/20030814011949/http:www.faqs.org/docs/evms/loglevels.html, (Aug. 14, 2003), p. 1.

* cited by examiner

COMMON TRACE FILES

TECHNICAL FIELD

Embodiments of the invention generally relate to the field of data processing systems and, more particularly, to a system and method for employing common tracing for multiple components.

BACKGROUND

Even though standards-based application software (e.g., JAVA based application software) has the potential to offer true competition at the software supplier level, legacy proprietary software has proven reliability, functionality and integration into customer information systems (IS) infrastructures. Customers are therefore placing operational dependency on standards-based software technologies with caution. Not surprisingly, present day application software servers tend to include instances of both standard and proprietary software suites, and, often, "problems" emerge in the operation of the newer standards-based software, or interoperation and integration of the same with legacy software applications.

The prior art application server 100 depicted in FIG. 1A provides a good example. FIG. 1A shows a prior art application server 100 having both an ABAP legacy/proprietary software suite 103 and a JAVA J2EE standards-based software suite 104. A connection manager 102 routes requests (e.g., HTTP requests, HTTPS requests) associated with "sessions" between server 100 and numerous clients (not shown) conducted over a network 101. A "session" can be viewed as the back and forth communication over a network 101 between computing systems (e.g., a particular client and the server).

The back and forth communication typically involves a client ("client") sending a server 100 ("server") a "request" that the server 100 interprets into some action to be performed by the server 100. The server 100 then performs the action and if appropriate returns a "response" to the client (e.g., a result of the action). Often, a session will involve multiple, perhaps many, requests and responses. A single session through its multiple requests may invoke different application software programs.

For each client request that is received by the application server's connection manager 102, the connection manager 102 decides to which software suite 103, 104 the request is to be forwarded. If the request is to be forwarded to the proprietary software suite 103, notification of the request is sent to a proprietary dispatcher 105, and, the request itself is forwarded into a request/response shared memory 106. The proprietary dispatcher 105 acts as a load balancer that decides which one of multiple proprietary worker nodes $107_1$, through $107_N$ are to actually handle the request.

A worker node is a focal point for the performance of work. In the context of an application server that responds to client-server session requests, a worker node is a focal point for executing application software and/or issuing application software code for downloading to the client. The term "working process" generally means an operating system (OS) process that is used for the performance of work and is also understood to be a type of worker node. For convenience, the term "worker node" is used throughout the present discussion.

When the dispatcher 105 identifies a particular proprietary worker node for handling the aforementioned request, the request is transferred from the request/response shared memory 106 to the identified worker node. The identified worker node processes the request and writes the response to the request into the request/response shared memory 106. The response is then transferred from the request/response shared memory 106 to the connection manager 102. The connection manager 102 sends the response to the client via network 101.

Note that the request/response shared memory 106 is a memory resource that each of worker nodes $107_1$ through $107_L$ has access to (as such, it is a "shared" memory resource). For any request written into the request/response shared memory 106 by the connection manager 102, the same request can be retrieved by any of worker nodes $107_1$ through $107_L$. Likewise, any of worker nodes $107_1$ through $107_L$ can write a response into the request/response shared memory 106 that can later be retrieved by the connection manager 102. Thus the request/response shared memory 106 provides for the efficient transfer of request/response data between the connection manager 102 and the multiple proprietary worker nodes $107_1$, through $107_L$.

If the request is to be forwarded to the standards based software suite 104, notification of the request is sent to the dispatcher 108 that is associated with the standards based software suite 104. As observed in FIG. 1A, the standards-based software suite 104 is a JAVA based software suite (in particular, a JAVA 2 Enterprise Edition (J2EE) suite) that includes multiple worker nodes $109_1$ through $109_N$.

A JAVA Virtual Machine is associated with each worker node for executing the worker node's abstract application software code. For each request, dispatcher 108 decides which one of the N worker nodes is best able to handle the request (e.g., through a load balancing algorithm). Because no shared memory structure exists within the standards based software suite 104 for transferring client session information between the connection manager 102 and the worker nodes $109_1$ through $109_N$, separate internal connections have to be established to send both notification of the request and the request itself to the dispatcher 108 from connection manager 102 for each worker node. The dispatcher 108 then forwards each request to its proper worker node.

A virtual machine (VM), as is well understood in the art, is an abstract machine that converts (or "interprets") abstract code into code that is understandable to a particular type of a hardware platform (e.g., a particular type of processor). Because virtual machines operate at the instruction level they tend to have processor-like characteristics, and, therefore, can be viewed as having their own associated memory. The memory used by a functioning virtual machine is typically modeled as being local (or "private") to the virtual machine.

Various problems exist with respect to the prior art application server 100 of FIG. 1A. For example, as application development projects grow larger, tracing becomes both increasingly important and cumbersome. "Tracing" is a technique used primarily by software developers to track the execution of program code. For example, when developing an application, developers trace the execution of methods or functions within certain modules to identify problems and/or to determine if the program code may be improved. If a particular method takes an inordinate amount of time to complete, the developer may determine the reasons why and/or change the program code to operate more efficiently.

Typically, developers use trace tools to trace the execution of program code. Trace tools are proprietary application programs which use different techniques to trace the execution flows for an executing program. One technique, referred to as event-based profiling, tracks particular sequences of instructions by recording application-generated events as they occur. By way of example, a trace tool may record each entry into, and each exit from, a module, subroutine, function, method, or system component within a trace file (e.g., a time-stamped entry may be recorded within the trace file for each such event). Trace events may also be sent to a console or other output destination.

FIG. 1B illustrates a prior art trace mechanism 150. The mechanism 150 utilizes a tracer module 158 to receive tracing messages from various components 152-156. The components include virtual machines, work processors, worker nodes, and the like. The tracer module 158 provides tracing messages to a handler 158, which directs the tracing messages to a formatter 160. The handler 158 is used to determine where such tracing messages should be sent. The formatter 158 then provides tracing output to various trace files 162-166. Each of the trace file 162-166 corresponds to each of the components 152-156 (e.g., trace file 1 162 corresponds to component 1 152) providing tracing messages received from such components 152-156.

The conventional trace tools do not provide for integration of various trace files relating to various corresponding components. This often leads to misreading of errors as accurate comparison between the trace files is required for an accurate reading of the errors. The problem is exasperated when a development project involves a great number of applications, components, modules, or developers. The problem is further complicated when different interfaces and/or services are used across the development project.

SUMMARY

A method and system for generating common trace files for multiple components. In one embodiment, separate trace information is received from multiple components. The separate trace information received from multiple components is integrated into a single common trace file to provide common trace information for multiple components. In one embodiment, the common trace information contained in the common trace file is filtered and/or sorted in accordance with a predetermined criteria.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
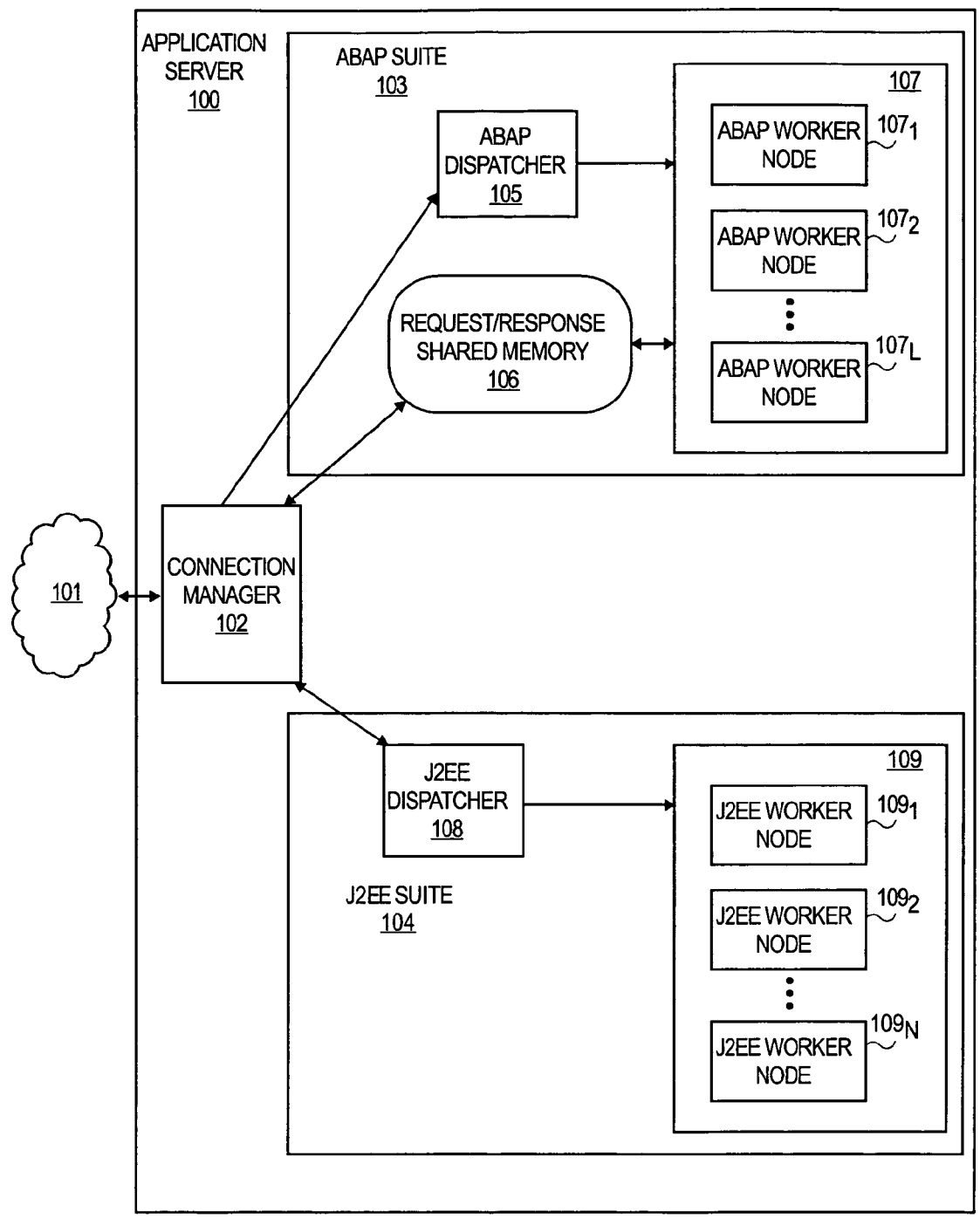
FIG. 1A illustrates a prior art application server.
Figure 1B:
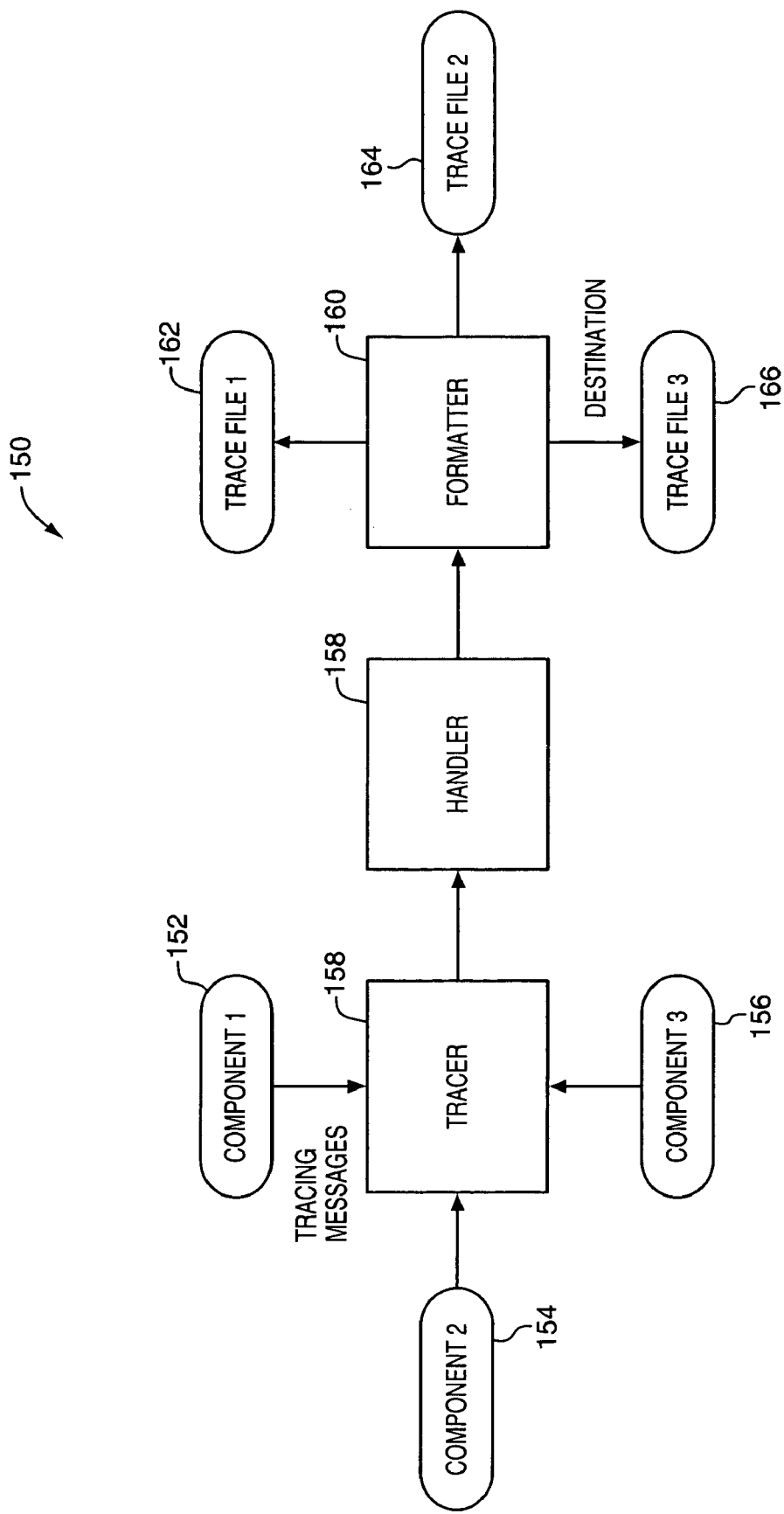
FIG. 1B illustrates a prior art trace mechanism.

Described below is a system and method for employing common tracing for multiple components. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), Digital Video Disk ROM (DVD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
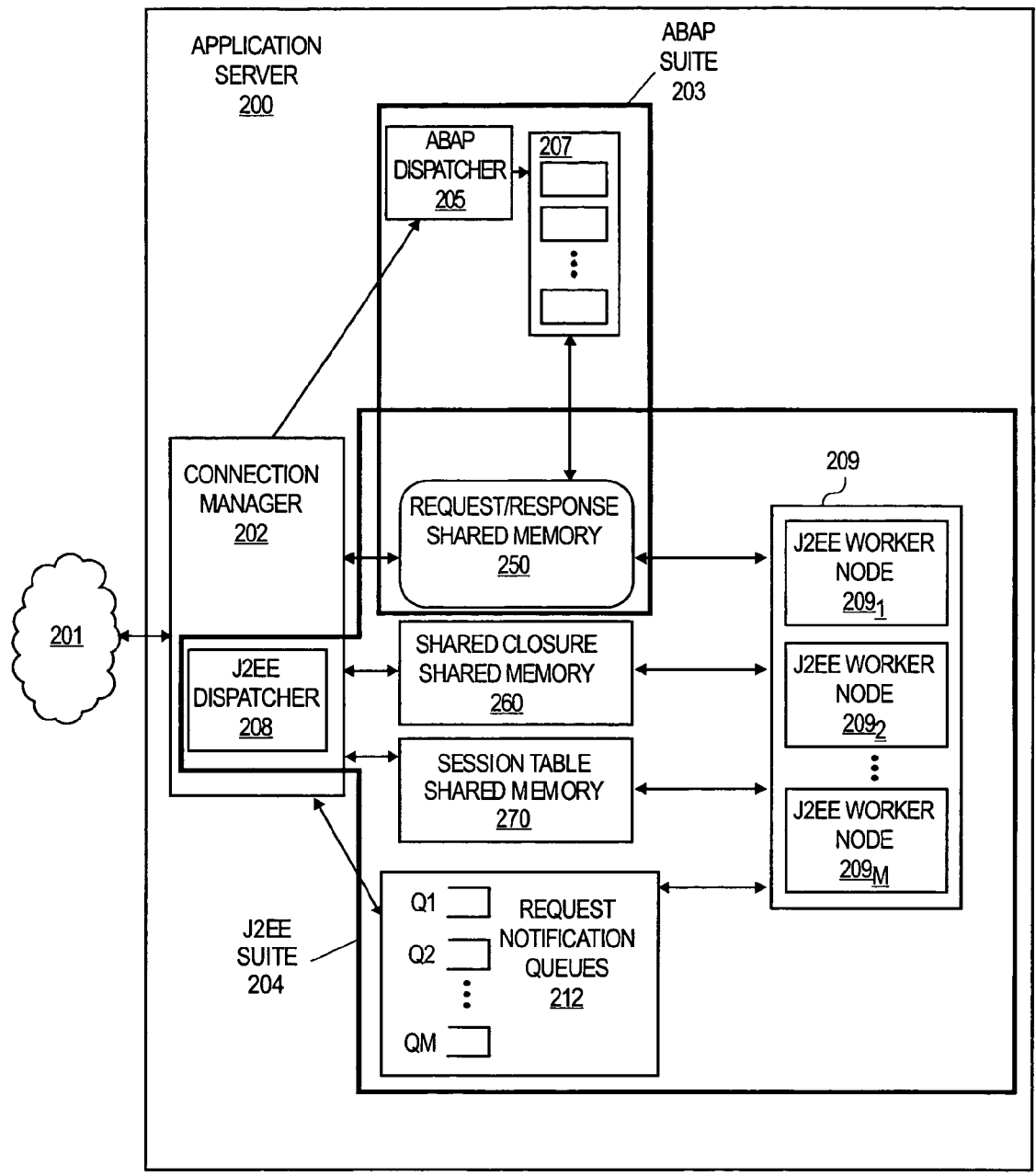
FIG. 2 shows the architecture of an improved application server in accordance with embodiments of the invention.

FIG. 2 shows the architecture of an improved application server 200 in accordance with embodiments of the invention. First, in comparison to FIG. 1A, the role of the connection manager 202 has been enhanced to at least perform dispatching 208 for the standards based software suite 204 (so as to remove the additional connection overhead associated with the prior art system's standards-based software suite dispatching procedures).

Second, the connection manager 202 is protocol independent. A protocol handler can be plugged into the connection manager 202 to support any one of a number of protocols by which a request can be conveyed to the connection manager 202. For example, handlers for protocols such as the hypertext transfer protocol (HTTP), secure HTTP (HTTPS), simple mail transfer protocol (SMTP), network news transfer protocol (NNTP), Telnet, File Transfer Protocol (FTP), Remote Method Invocation (RMI), P4 (a proprietary protocol used by the assignee of this application), and T3, available from BEA Systems, Inc., may be provided at the connection manager so that it can receive a request conveyed from a client in accordance with any of these protocols.

Third, the role of a shared memory has been expanded to at least include: (a) a first shared memory region 250 that supports request/response data transfers not only for the proprietary suite 203 but also the standards based software suite 204; (b) a second shared memory region 260 that stores session objects having "low level" session state information (i.e., information that pertains to a request's substantive response such as the identity of a specific servlet invoked through a particular web page); and, (c) a third shared memory region 270 that stores "high level" session state information (i.e., information that pertains to the flow management of a request/response pair within the application server (e.g., the number of outstanding active requests for a session)).

Fourth, request notification queues 212 Q1 through QM, one queue for each of the worker nodes $209_1$ through $209_M$, has been implemented within the standards-based software suite 204. As will be described in more detail below, the shared memory structures 250, 260, 270 and request notification queues 212 help implement a fast session fail over protection mechanism in which a session that is assigned to a first worker node can be readily transferred to a second worker node upon the failure of the first worker node.

Shared memory is memory whose stored content can be reached by multiple worker nodes. Here, the contents of the shared memory region 250 can be reached by each of worker nodes in 207 and 209. Additionally, the contents of shared memory regions 260 and 270 can be reached by each of worker nodes $209_1$ through $209_M$. Different types of shared memory technologies may be utilized within the application server 200 and yet still be deemed as being a shared memory structure. For example, shared memory region 250 may be implemented within a "connection" oriented shared memory technology while shared memory region 260 may be implemented with a "shared closure" oriented shared memory technology. A more thorough discussion of these two different types of shared memory implementations is provided in more detail below in section 5.0 entitled "Implementation Embodiment of Request/Response Shared Memory" and section 6.0 entitled "Implementation Embodiment of Shared Closure Based Shared Memory".

The connection oriented request/response shared memory region 250 effectively implements a transport mechanism for request/response data between the connection manager and the worker nodes. That is, because the connection manager is communicatively coupled to the shared memory, and because the shared memory is accessible to each worker node, the request/response shared memory 250—at perhaps its broadest level of abstraction—is a mechanism for transporting request/response data between the connection manager and the applicable worker node(s) for normal operation of sessions (i.e., no worker node failure) as well as those sessions affected by a worker node crash.

Although the enhancements of the application server 200 of FIG. 2 have been directed to improving the reliability of a combined ABAP/J2EE application server, it is believed that improved architectural features and methodologies can be more generally applied to various forms of computing systems that manage data processing and communicative sessions, whether or not such computing systems contain different types of application software suites, and whether any such application software suites are standards-based or proprietary. Moreover, it is believed that such architectural features and methodologies are generally applicable to data processing and communicative sessions regardless of, for example, any particular type of shared memory technology employed.

For example, in operation, the connection manager 202 forwards actual request data to the first shared memory region 250 (request/response shared memory 250) regardless of whether the request is to be processed by one of the proprietary worker nodes 207 or one of the standards based worker nodes 204. Likewise, the connection manager 202 receives response data for a request from the request/response shared memory 250 whether a proprietary worker node or a standards based worker node generates the response.

With the exception of having to share the request/response shared memory 250 with the worker nodes 209 of the standards-based software suite 204, the operation of the proprietary software suite 203 is essentially the same as that described in the background, in one embodiment of the invention. That is, the connection manager 202 forwards request notifications to the proprietary dispatcher 205 and forwards the actual requests to the request/response shared memory 250. The proprietary dispatcher 205 then identifies which one of the proprietary worker nodes 207 is to handle the request. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

In an alternative embodiment, the ABAP dispatcher 205 is integrated into the connection manager, just as the J2EE dispatcher 208. Indeed, it is contemplated that a single dispatcher may encompass the functionality of both dispatchers 205 and 208. In the case where the dispatcher 205 is integrated into the connection manager 202, the connection manager identifies which one of the proprietary worker nodes 207 is to handle a request and via its integrated dispatcher capabilities, forwards the request to the request/response shared memory 250. The identified worker node subsequently retrieves the request from the request/response shared memory 250, processes the request and writes the response into the request/response shared memory 250. The response is then forwarded from the request/response shared memory 250 to the connection manager 202 who forwards the response to the client via network 201.

Figure 3:
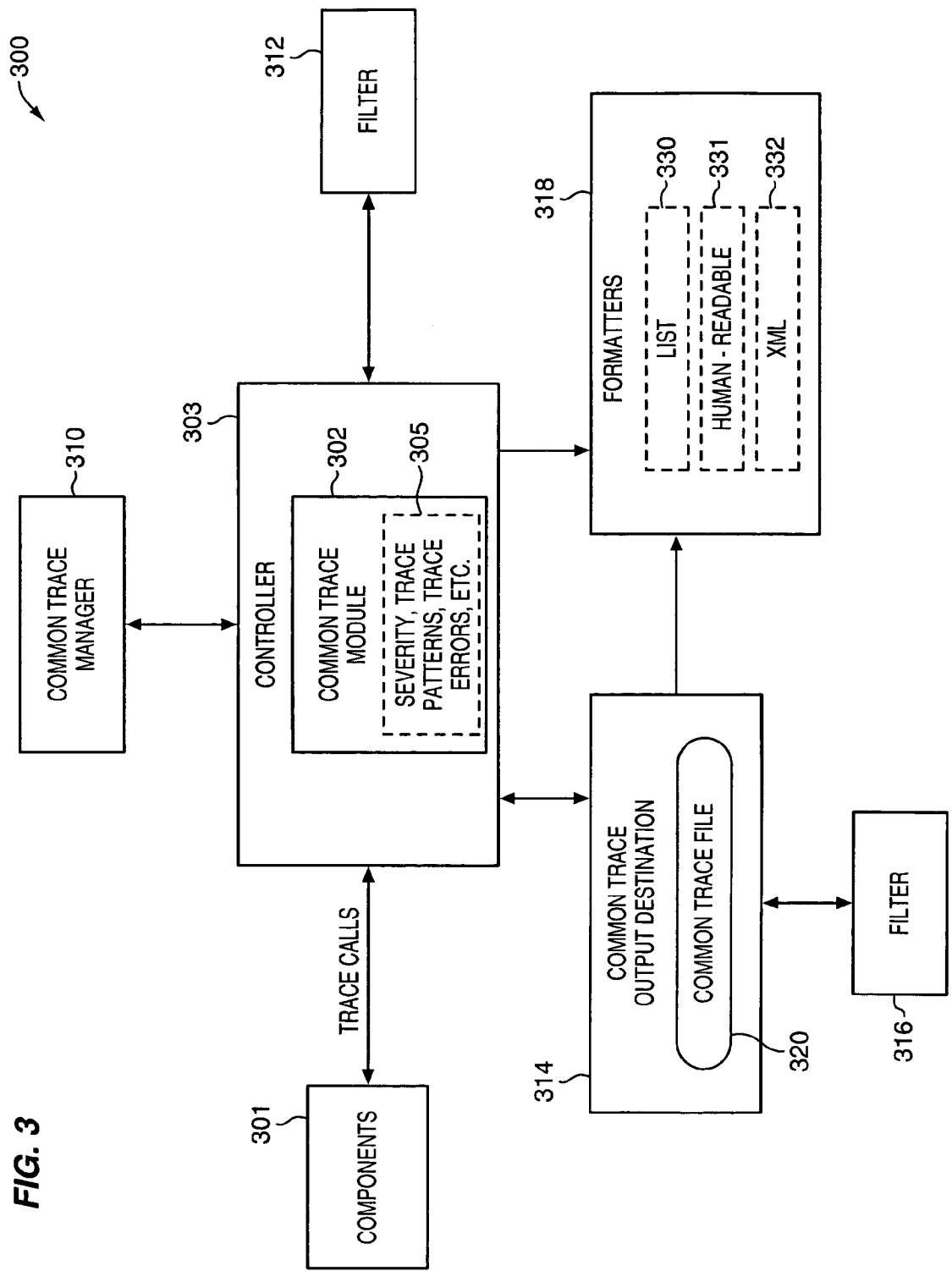
FIG. 3 illustrates an embodiment of a trace system architecture for common tracing.

FIG. 3 illustrates an embodiment of a trace system architecture 300 for common tracing. The architecture 300 includes a plurality of controllers 303 managed by a trace manager 310. The controllers 303 are configured to process trace events generated by various applications at various components 301. As used herein, the term "application" is used broadly to refer to any type of program code executed on a computer and/or transmitted over a network (e.g., using a particular network protocol). One embodiment of the invention is implemented in an object-oriented programming environment such as JAVA (e.g., within a JAVA 2, Enterprise Edition (J2EE) platform/engine). In this embodiment, each of the illustrated modules is represented by objects and/or classes.

The classes and/or objects of this embodiment comprise an Application Programming Interface ("API") usable to configure tracing operations within a JAVA environment. It should be noted, however, that the underlying principles are not limited to any particular programming environment.

In one embodiment, each controller 303 is an instance of a defined "controller" class (e.g., a JAVA class) which includes a "tracing" sub-class to provide features specific to tracing operations. It is contemplated that the controller 303 may also include a "logging" sub-class to provide features specific to logging operations. In one embodiment, using an object-oriented environment, such as JAVA, the common trace module 302 may represent an instance of the tracing sub-class. In one embodiment, the common trace module 302 may include one or more trace modules associated with program code locations (e.g., locations within packages, classes, . . . , etc.) such that the common trace module 302 is used to provide a common trace file 320 having trace messages from various components (in one trace file 320) as opposed to providing a separate trace file associated with each of the components.

For example, component tracing may include component tracing of virtual machines, work processors, worker nodes, garbage collection, and the like. Such tracing of components provides trace messages in various trace files that are not gathered at the same time. For example, a trace message may be recorded at 2:00 PM in a VM trace file, while a trace message is recorded at 2:01 PM in a work processor trace file regarding the same error. This makes it difficult for a developer to compare the two files to accurately analyze the nature of the error, its function level, its severity, and such. In one embodiment, the common trace module 302 is used to work with the common trace manager 310 and with various controllers 303 associated with various components to facilitate a resulting common trace file 320 to provide trace messages from various components. In one embodiment, the common trace module 302 may provide methods for integrating various trace output destinations associated with various controllers 303 into one trace output destination 314. Further, the common trace module 302 may be used for controlling the actual writing of trace messages.

In one embodiment, in addition to providing a common trace file 320 for various components, the common trace module 302 may be used to trace messages based on other factors, such as severity-based trace levels, trace patterns, and trace errors. For example, a trace pattern may be adopted based upon the occurrence of a new condition. For example, the occurrence of a particular error may be qualified as a new condition, which in turn may lead to creating a particular tracing pattern for the common trace module 302. It is contemplated that trace pattern may be adopted, changed, or removed by the developer or automatically by the application server upon meeting or not meeting of certain thresholds. Similarly, a particular error or set of errors may be regarded as very important, which may lead to adding a higher trace level that particular error. Using this technique, the common trace module 302 may regard a particular error or situation or a particular set of errors or situations in high regard and sort the common trace file 320 in accordance with the error trace level. Similarly, errors may be traced based on the already-defined severity levels for high to low or vice versa.

For example, when a method is called, the writing of the trace message to the common trace file 320 may be performed using the severity level associated with the message, the severity settings 205 of the relevant controller(s) 303, and the filtering configuration of one or more optional filters 312, 316. For example, in one embodiment, trace messages having a severity level greater than or equal to the effective severity of the relevant controller 303 are candidates for output and are forwarded to the common trace file 320 associated with the controller 303 (e.g., assuming the trace messages are not filtered by one of the filters 312, 316).

A variety of different severity levels may be defined. In one embodiment of the invention, the following severity levels are defined (from lowest to highest severity level): MINIMUM, DEBUG, PATH, INFO, WARNING, ERROR, FATAL, and MAXIMUM. In addition, tracing may be totally enabled or disabled using the severity settings of ALL or NONE, respectively. Further, each of the descriptive threshold levels may have an associated numeric value (e.g., DEBUG=100, PATH=200, . . . , etc.). Similarly, trace patterns and trace errors may be tracked; however, not the same severity levels may be associated with trace patterns and trace errors as they may be assigned a separately-defined set of severity levels.

In one embodiment, each of the components may be assigned an identification value or name for tacking purposes. For example, each of the VMs may be assigned a unique identification (e.g., <vmid>) to that the VMs can be identified. Such identification information may be used to facilitate the filtering of trace messages based on which VM is to be traced. For example, there are three VMs that are identified as VM1, VM2, and VM3, of which, VM3 is regarded the one with highest importance, VM2 is regarded as moderately important, and VM1 is regarded as least important for tracing purposes. In this case, one of the filters 312, 316, such as filter 316, may be set such that it would provide any trace messages from VM3 with higher priority over trace messages from VM1 and VM2. Similarly, if trace messages are being received from VM2 and VM1, trace messages from VM2 are assigned a higher priority over trace messages from VM1 and are provided in the common trace file 320. This filtering mechanism uses component identification to, first, identify the component and then, assign a predefined priority level to those components and trace messages from such components. Stated differently, not only the filtering mechanism provides filtering of trace information based on a predefined filtering criteria, but also sorting of trace information based on a predefined sorting criteria. It is contemplated that such identifications are assigned to any number of components, not limited to VMs, such as work processors, worker nodes, and the like. In one embodiment, filters 312, associated with the controller 303, may also use other predefined filtering criteria to filter trace messages before and/or after evaluating the trace messages based on the criteria (e.g., such component identification, severity level, etc.) described above.

In one embodiment, a common trace console (not shown) may be provided as another common trace output destination 314 in addition to or in substitution to the common trace file 320. If a particular controller 303 is capable of writing to both a file 320 and a console, a filter 312 may be assigned to filter messages directed to the file 320, thereby limiting output to the console only. Thus, using filters 312, 316, a finer granularity of output may be defined, using a wide variety of variables. As illustrated, filters may be associated with particular controller 303 and/or with specific output destinations 314 (e.g., common trace file 320). As mentioned above, filters may be associated with both controllers 303 and/or output destinations 314 to further restrict or alter the output tracing behavior. In one embodiment, multiple filters having different filtering criteria may be allocated to each controller 303 and/or destination 314.

In one embodiment, instances of the tracing sub-class (e.g., tracing modules) are associated with specified program code regions of applications. The tracing modules receive method calls from the applications and process the method calls based on defined severity levels, trace errors, trace patterns, component identification, and the like. A viewer may be provide access to trace information generated by the tracing system architecture 300 in the common trace file 320. Further, in one embodiment, tracing operations performed by the trace controllers 303 having a common trace module 302 are associated with particular program code locations, identified by particular package, class, function names, and the like. For example, in a JAVA environment, locations may be named according to the hierarchical structure known from JAVA packages.

Figure 4:
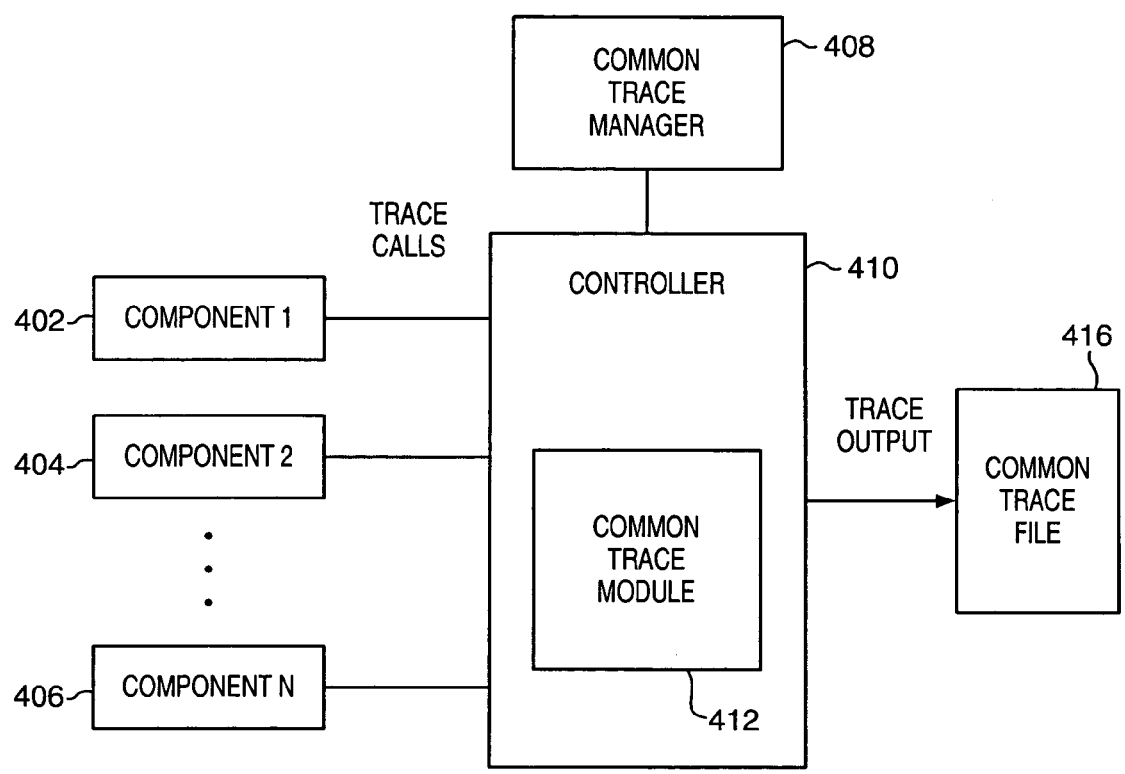
FIG. 4 illustrates an embodiment of a common trace mechanism.

FIG. 4 illustrates an embodiment of a common trace mechanism 400. The illustrated embodiment of the common trace mechanism 400 illustrates a common trace file 416 for multiple components 1-N 402-406. In one embodiment, trace calls or messages are received from multiple components 402-406, such as virtual machine, work processes, worker nodes, and the like, at the trace controller 410. The trace controller 410 works with the common trace manager 402 to receive trace calls from various components 402-406. The trace calls are processed at the controller 410 by the common trace module 412 which integrates the trace calls from different components 402-406 and provides a common trace file 416 for the benefit of the developers. Stated differently, each of the components 402-406 is associated with the same common trace file 416 to provide common trace information to the developer to help avoid accessing multiple trace files.

Figure 5:
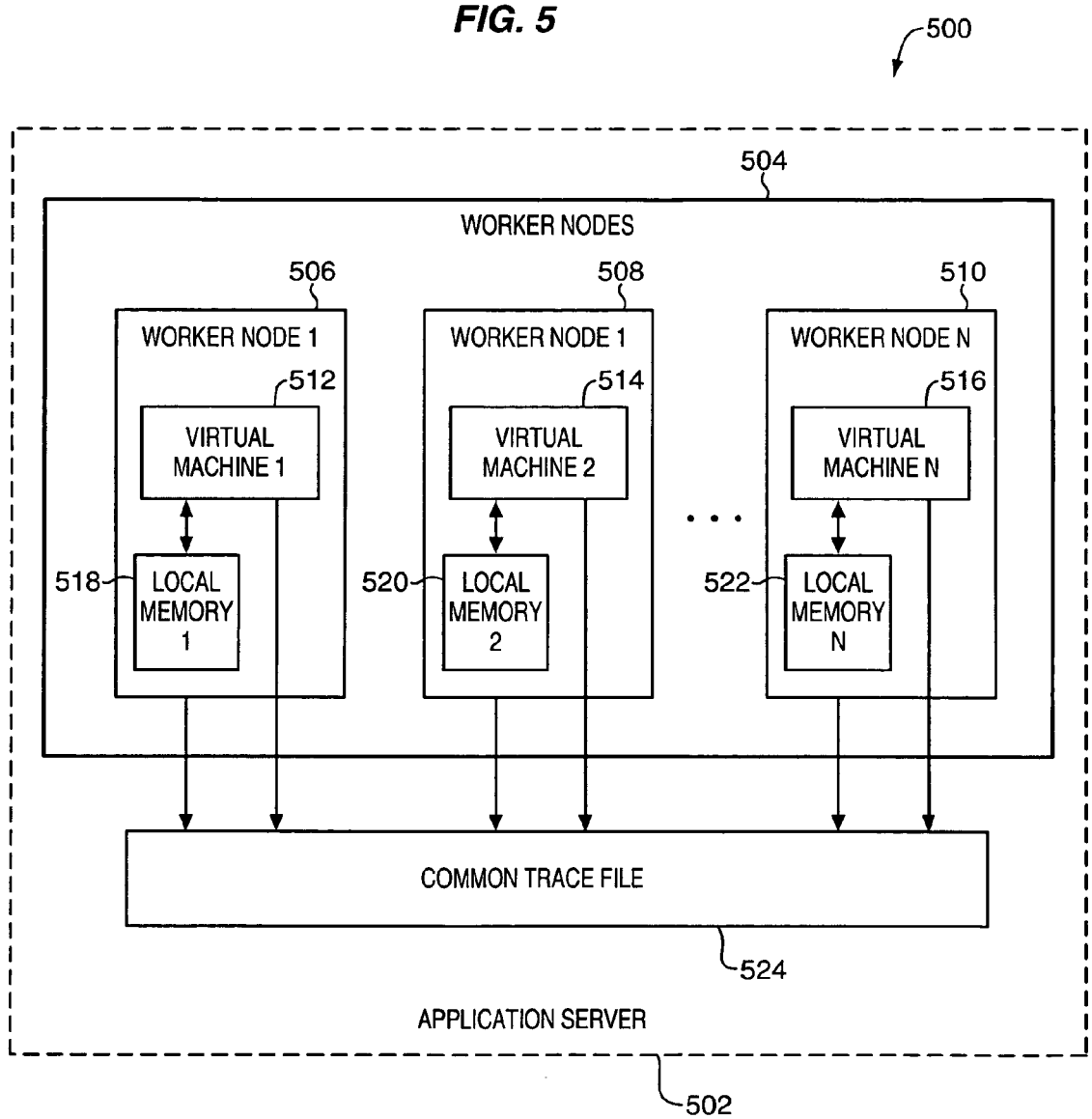
FIG. 5 illustrates an embodiment of a common trace mechanism.

FIG. 5 illustrates an embodiment of a common trace mechanism 500. The illustrated embodiment of the trace mechanism 800 shows worker nodes 504 having individual worker nodes 506-510 residing at the application server 502. The worker nodes 504 may include J2EE worker nodes, ABAP work processes, and the like. The worker nodes 504 are configured to work with virtual machines 512-516, each of the virtual machines 512-516 is further associated with its own local memory 518-522.

A worker node 506-510, in the context of the application server 502, is regarded as the focal point for executing application software and/or issuing application software code for downloading to the client. As described earlier, worker nodes 504 also include work processes, which generally refer to operating system processes that are used for performance of work and are understood to be a type of worker node. Throughout this application, the terms worker node and work process are used interchangeably. Each of the worker nodes 506-510 is associated with a virtual machine 512-516. A VM 512-516 is an abstract machine that can include an instruction set, a set of registers, a stack, a heap, and a method area, like a real machine or processor. A VM 512-516 essentially acts as an interface between program code and the actual processor or hardware platform on which the program code is to be executed. The program code includes instructions from the VM instruction set that manipulates the resources of the VM 512-516.

In the illustrated embodiment, a trace common module (not shown) works with the trace manager and controllers to provide a common trace file 524 for providing and storing trace information for exceptions generated both at the virtual machines 512-516 and worker nodes 506-510. For example, a VM 512-516 can directly throw an exception in response to detecting an error, for example, due to an arithmetic exception, such as dividing by zero, or indexing exception, which may be caused by trying to access an array element with an index outside of the array bounds. Exceptions can also be thrown by JAVA code using the throw statement. These program exceptions can include additional information provided by the programmer from data that is accessible at the point where the exception is thrown that can be used to identify the source of the problem that caused the exception. Further, a developer can throw exceptions that trigger the technique at certain points in a program to provide trace information providing information as to the state virtual machine 512-516 at different times during execution of the program.

In one embodiment, the common trace file 524 includes a common trace file for maintaining trace information and messages by not only providing a single trace file for each of the virtual machines 512-516 and each of the worker nodes 506-510, but it provide a single trace file for both the virtual machines 512-516 and the worker nodes 506-510. Such common trace file 524 helps the developer access a single trace file for accessing the VM- and worker node-related trace information.

Furthermore, in one embodiment, a filter (not shown) is employed to filter the trace information according to a component (e.g., virtual machine 2 514 gets the highest priority), a type of error, a pattern of error, the severity level of the error, and the like. This can be achieved by having the filter work the common trace module at the controller to filter out the unwanted and/or unnecessary trace information, as well as sort the remaining trace information in accordance with one or more categories described above.

Figure 6:
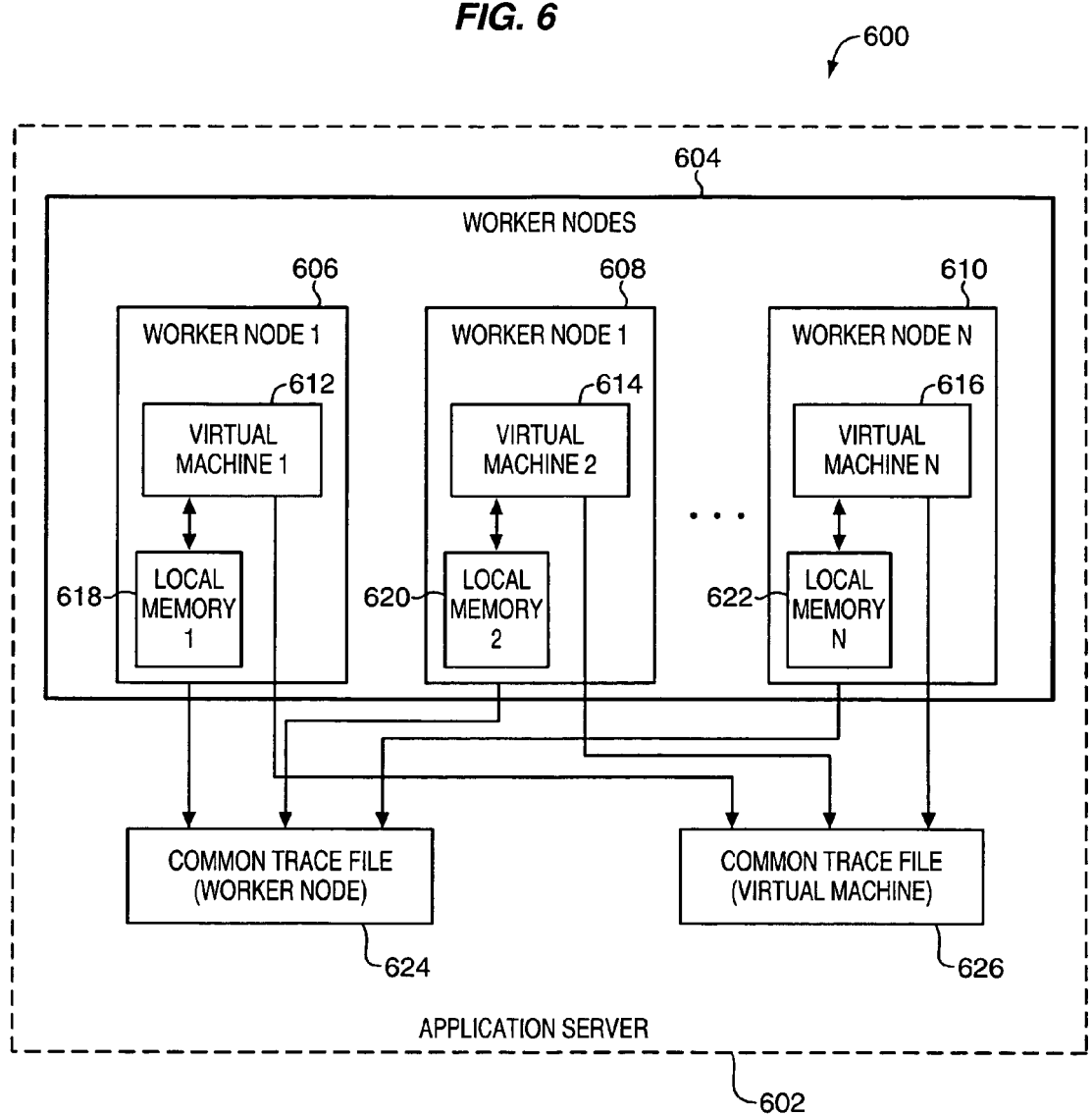
FIG. 6 illustrates an embodiment of a common trace mechanism.

FIG. 6 illustrates an embodiment of a common trace mechanism 600. In the illustrated embodiment, the common trace mechanism 600 includes a set of worker nodes 604 having worker nodes 606-610 associated with virtual machines 612-616 residing at an application server 602. Each of the virtual machines 612-616 is further associated with a local memory 618-622.

In one embodiment, a common trace file 624-626 is provided for each type of the illustrated component. For example, a common trace file 624 is generated to provide and store trace information relating to the worker nodes 606-610. The worker node common trace file 624 serves as the common trace file 624 for the developer to access to find worker node-related trace information. Similarly, a common trace file 626 is generated to provide and store trace information relating to the virtual machines 612-616. The virtual machine common trace file 626 serves as the common trace file 626 for the developer to access to find virtual machine-related trace information. It is contemplated that the filtering mechanism, as described above, may be employed to distribute filtered and/or sorted information via each of the common trace files 624-626.

Figure 7:
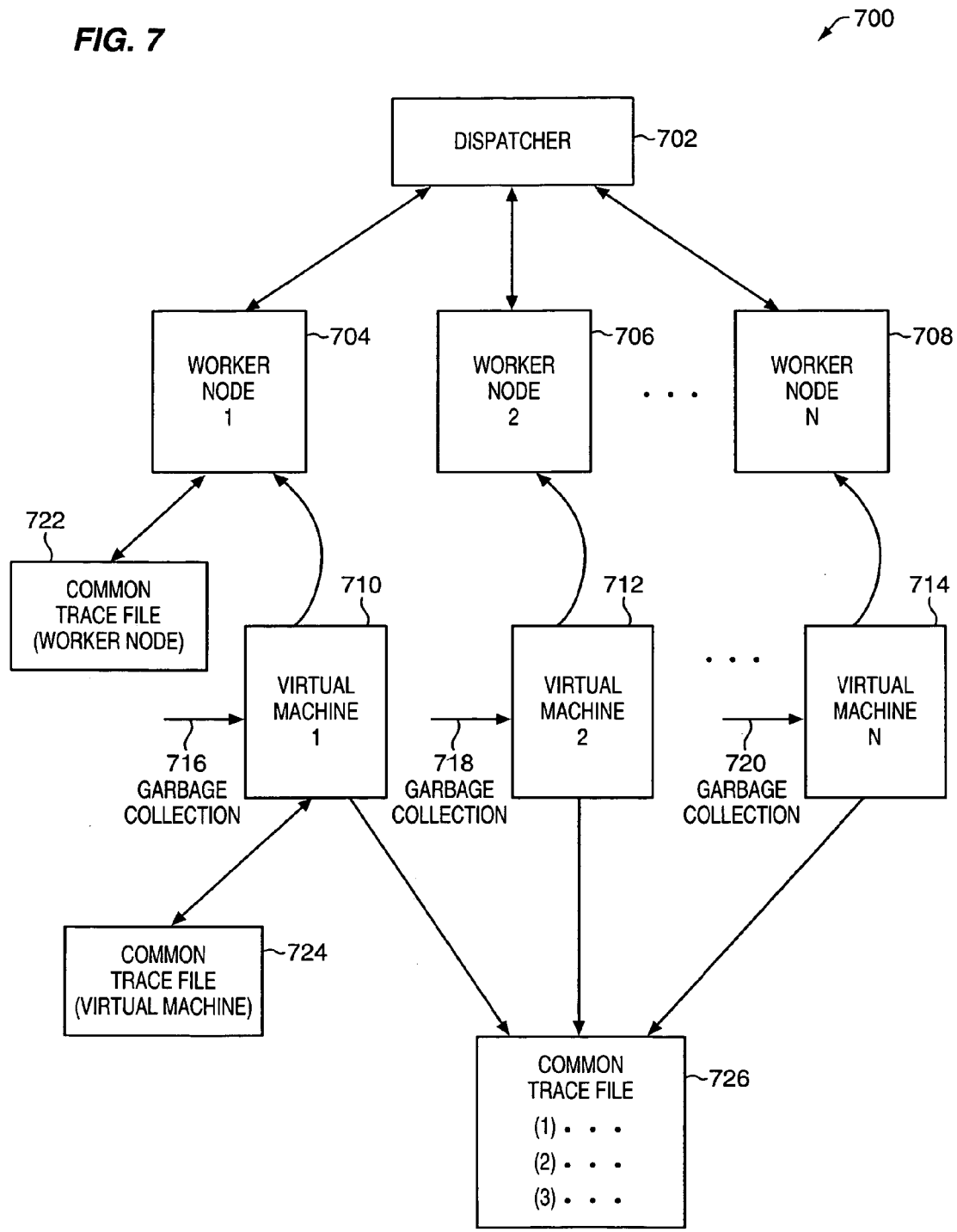
FIG. 7 illustrates an embodiment of a common trace mechanism.

FIG. 7 illustrates an embodiment of a common trace mechanism 700. In the illustrated embodiment, a set of virtual machines 710-714 are provided in association with a set of worker nodes 704-708 (e.g., ABAP work processes or J2EE worker nodes) that are further in communication with a dispatcher 702. A connection manager (not shown) typically receives a request from a network and determines the request should be handled by the standards-based software suite, the session to which the request belongs is identified (or the request is identified as being the first request of a new session). For example, the connection manager determines the existing session to which the request belongs or that the request is from a new session through well understood techniques (e.g., through a session identifier found in the header of the received request or a Uniform Resource Locator (URL) path found in the header of the received request).

Then, the dispatcher 702 for the standards-based software suite is invoked by executing a particular dispatching algorithm. For purposes of this discussion, it is sufficient to realize that the dispatcher 702: (1) accesses and updates at "high level" state information for the request's session in a shared memory session table (not shown); (2) determines which one of the worker nodes 704-708 ought to handle the newly arrived request; and (3) submits at the request into the request/response shared memory and submits at a request notification for the request into a request notification queue that is associated with the worker node 704-708 selected by the dispatching algorithm.

In one embodiment, using the trace manager, trace controller, and common trace module of the common trace mechanism 700, a common trace file 722 is created for tracking the trace information relating to the worker nodes 704-708. Such common trace file 722 is created by the common trace module by integrating various worker node-related trace files, each of which corresponding to each of the worker nodes 704-706. For example, worker nodes 1-N 704-706 are associated with the same number of trace files 1-N providing separate information for each of the worker nodes 704-706. By using the common trace module along with the trace controller, such trace files are integrated into a single common trace file 722 to track trace information relating to the worker nodes 704-706.

Similarly, in one embodiment, a common trace file 724 is also generated for all of the virtual machines 710-714. A with the common trace file 722, the virtual machine common trace file 724 serves as an integrated common trace file for tracking trace information relating to the virtual machines 710-714.

In one embodiment, a master common trace file 726 may be provided to have one common trace file for various components (such as the one described with reference to FIG. 5). Stated differently, various common trace files 722, 724 are further integrated into a single common trace file 726 that serves for tracking trace information for each of the relevant components, including worker nodes 704-706 and virtual machines 710-714. In another embodiment, the common trace file 726 is used for other purposes, such as tracking trace information relating to yet another set of components, or for other tasks, such as garbage collection.

In the illustrated embodiment, the common trace file 726 is used for tracking garbage collection 716-720 relating to virtual machines 710-714. Garbage collection 716-720 refers to a process designed to identify and reclaim blocks of memory that have been dispensed by a memory allocator but that are no longer "live" (e.g., no longer being used, as determined, for example, by not being reachable from any currently referenced objects or entities). Entities that are garbage collected are typically referred to as being "dead" as opposed to being live. Garbage collection 716-720 is usually handled as a background task by runtime systems rather than as an explicit task by user programs. There are some costs associated with garbage collection 716-720, as access to memory is typically restricted and runtime systems sometimes are halted during some portions of garbage collection process.

In one embodiment, a common trace file 726 is provided for tacking trace information relating to multiple garbage collections 716-720. In the illustrated embodiment, three common trace files 722-726 are employed for tracking trace information relating to worker nodes 704-708, virtual machines 710-714, and garbage collection 716-720, as opposed to employing a separate trace file associated with each of the worker nodes 704-708, virtual machines 710-714, and garbage collection processes 716-720. In another embodiment, a common trace file or a different combination of trace files may be provided for various components. For example, a single trace file is provided for worker nodes 704-708 and virtual machines 710-714, while a separate trace file 726 is maintained for garbage collection 716-720.

In one embodiment, as described earlier, a filter may be employed along with the common trace module to facilitate filtering and/or sorting of the trace information being tracked at various common trace files 722-726. The filtering and sorting of the trace information is performed using any one or more of component priorities using component identification, trace patterns, trace errors, severity levels, and the like, as described elsewhere in this description.

Figure 8:
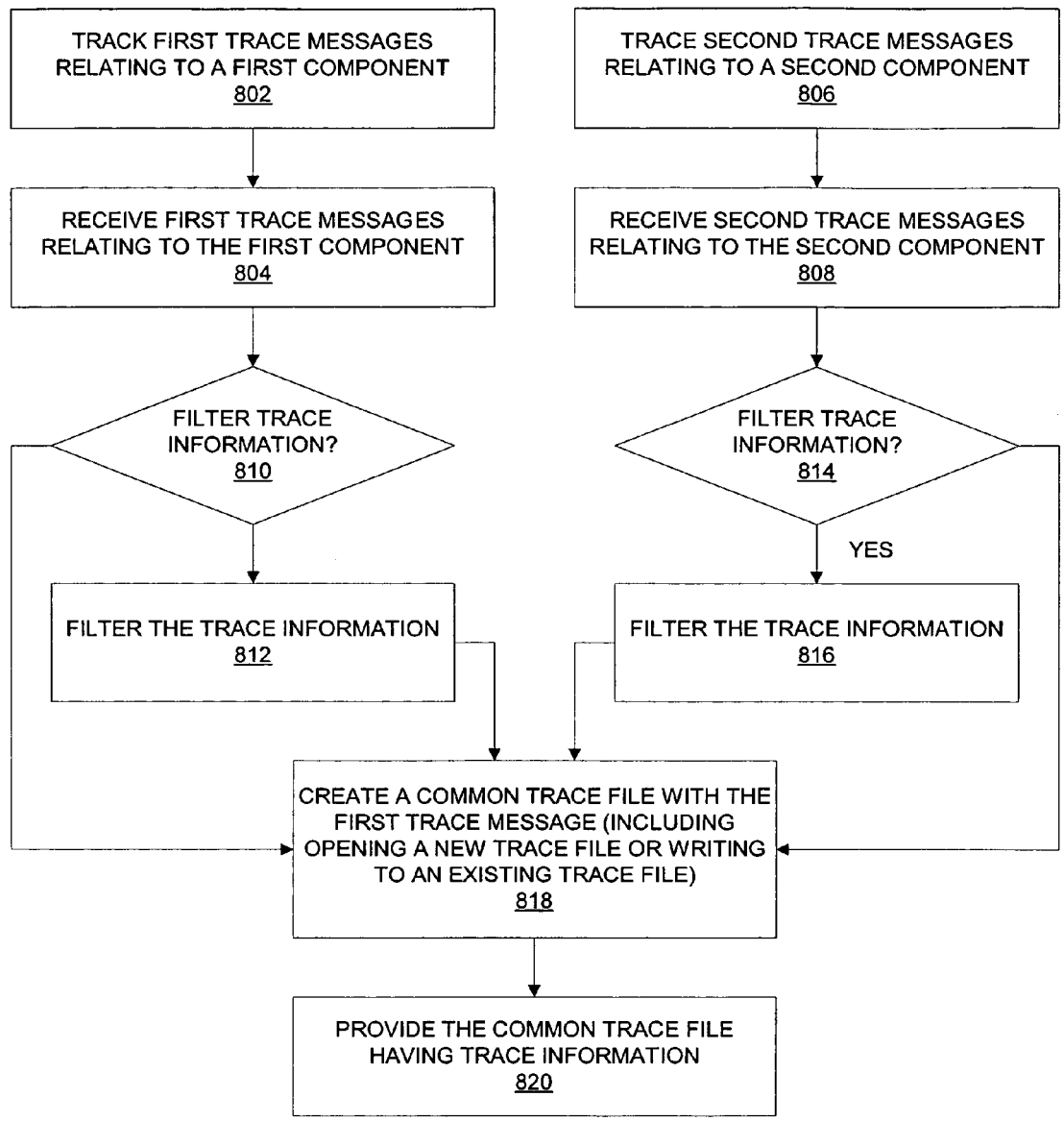
FIG. 8 illustrates an embodiment of a process for performing common tracing.

FIG. 8 illustrates an embodiment of a process for performing common tracing. In one embodiment, first trace messages relating to a first component are tracked at processing block 802. The first trace messages relating to the first component are received at a first trace controller at processing block 804. At decision block 810, a determination is made as to whether filtering of the trace message is needed. If yes, the filtering of the trace messages is performed at processing block 812. Once the filtering is done, a common trace file is created using the filtered trace messages at processing block 818. If the filtering is not needed, the common trace file is created using trace messages at processing block 818.

As with the first trace messages, second trace messages relating to a second component are tracked at processing block 806. The second trace messages relating to the second component are received at a second trace controller at processing block 808. At decision block 814, a determination is made as to whether filtering of the trace message is needed. If yes, the filtering of the trace messages is performed at processing block 816. Once the filtering is done, a common trace file is created using the filtered trace messages at processing block 818. If the filtering is not needed, the common trace file is created using trace messages at processing block 818. The common trace file is provided at processing block 820.

In one embodiment, the trace file can be created with just one message and other messages would append to this trace file. Further, if a trace file already exists, the trace message can be written to an existing trace file, and there may not be a need to open a new trace file as the messages can be appended to the existing file.

Figure 9:
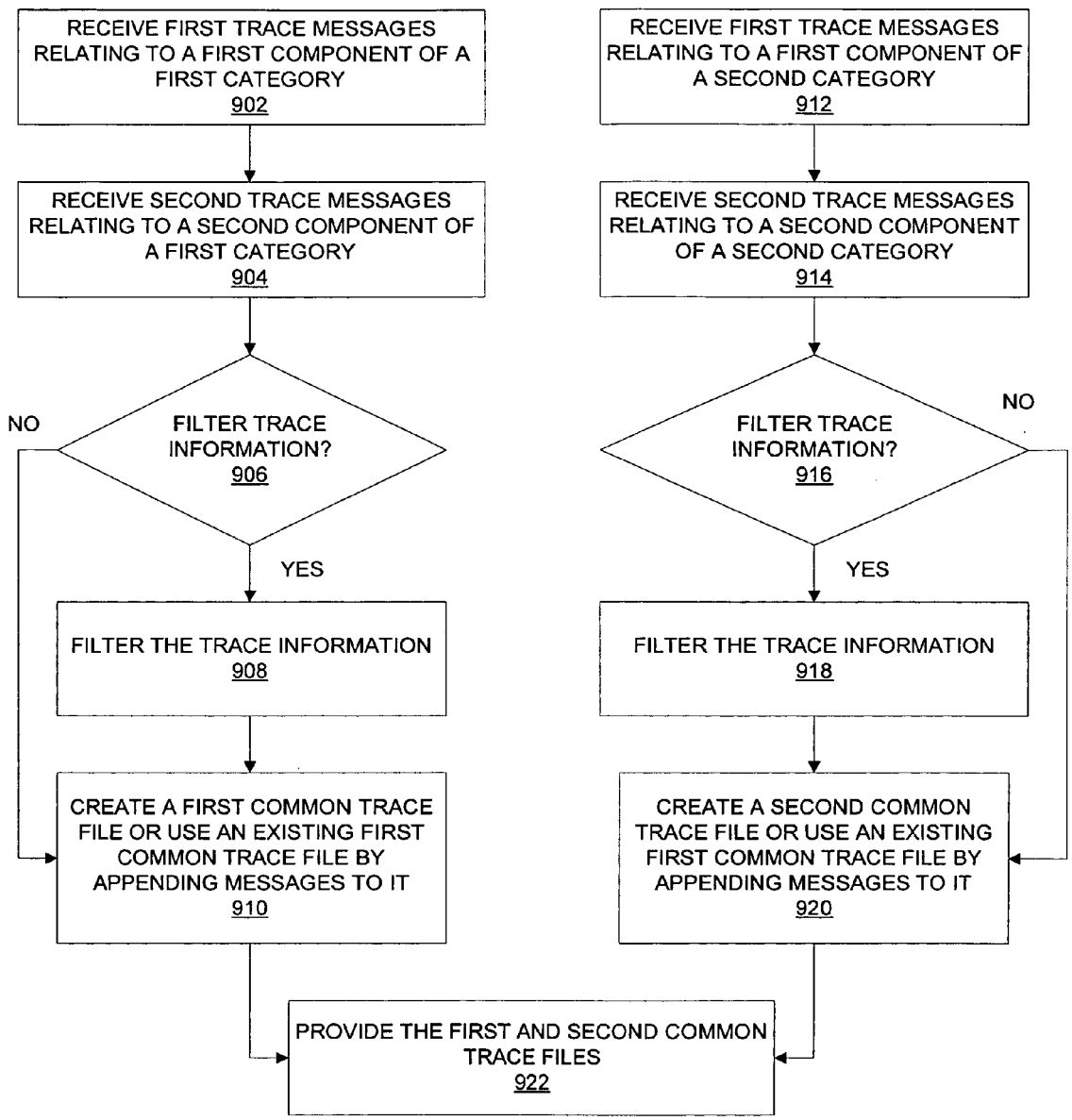
FIG. 9 illustrates an embodiment of a process for performing common tracing.

FIG. 9 illustrates an embodiment of a process for performing common tracing. In one embodiment, first trace messages relating to a first component of a first type are received at a first trace controller at processing block 902. Second trace messages relating to a second component of a first type are received at a first trace controller at processing block 904. For example, the first and second components of the first type include virtual machines. At decision block 906, a determination is made as to whether the trace information is to be filtered. If yes, the trace information is filtered at processing block 908. Once the filtering is performed, or if filtering is not needed, a first trace file is created at processing block 910. The first trace file may be created with a single message, while the rest of the messages may be appended to the first trace file. Also, an existing first trace file may be used by writing the trace messages to it, as opposed to opening a new file.

In one embodiment, first trace messages relating to a first component of a second type are received at a first trace controller at processing block 912. Second trace messages relating to a second component of a second type are received at a first trace controller at processing block 914. For example, the first and second components of the second type include worker nodes. At decision block 916, a determination is made as to whether the trace information is to be filtered. If yes, the trace information is filtered at processing block 918. Once the filtering is performed, or if filtering is not needed, a second trace file is created at processing block 920. As with the first trace file, the second trace file may be created with a single message, while the rest of the messages may be appended to the second trace file. Also, an existing second trace file may be used by writing the trace messages to it, as opposed to opening a new file. The first and second trace files are then provided at processing block 922.

The architectures and methodologies discussed above may be implemented with various types of computing systems such as an application server that includes a JAVA 2 Enterprise Edition ("J2EE") server that supports Enterprise JAVA Bean ("EJB") components and EJB containers (at the business layer) and/or Servlets and JAVA Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Figure 10:
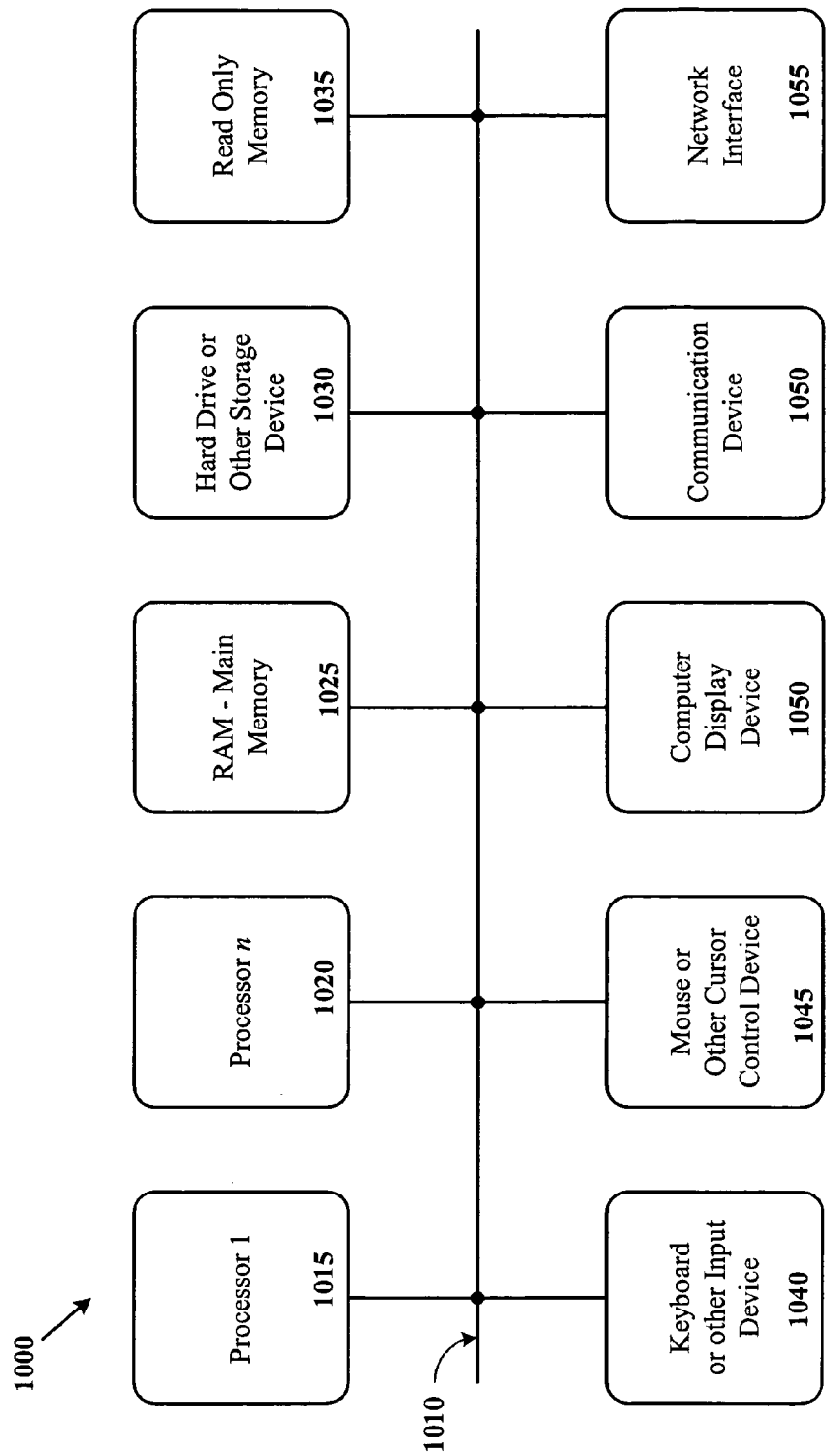
FIG. 10 is an exemplary computer system used in implementing an embodiment of the present invention.

FIG. 10 is an exemplary computer system 1000 used in implementing an embodiment of the present invention. In this illustration, a system 1000 comprises a bus 1010 or other means for communicating data. The system 1000 includes one or more processors, illustrated as shown as processor 1 1015 through processor n 1020 to process information. The system 1000 further comprises a random access memory (RAM) or other dynamic storage as a main memory 1025 to store information and instructions to be executed by the processor 1015 through 1020. The RAM or other main memory 1025 also may be used for storing temporary variables or other intermediate information during execution of instructions by the processors 1015 through 1020.

A hard drive or other storage device 1030 may be used by the system 1000 for storing information and instructions. The storage device 1030 may include a magnetic disk or optical disc and its corresponding drive, flash memory or other non-volatile memory, or other memory device. Such elements may be combined together or may be separate components. The system 1000 may include a read only memory (ROM) 1035 or other static storage device for storing static information and instructions for the processors 1015 through 1020.

A keyboard or other input device 1040 may be coupled to the bus 1010 for communicating information or command selections to the processors 1015 through 1020. The input device 1040 may include a keyboard, a keypad, a touch-screen and stylus, a voice-activated system, or other input device, or combinations of such devices. The computer may further include a mouse or other cursor control device 1045, which may be a mouse, a trackball, or cursor direction keys to communicate direction information and command selections to the processors and to control cursor movement on a display device. The system 1000 may include a computer display device 1050, such as a cathode ray tube (CRT), liquid crystal display (LCD), or other display technology, to display information to a user. In some environments, the display device may be a touch-screen that is also utilized as at least a part of an input device. In some environments, the computer display device 1050 may be or may include an auditory device, such as a speaker for providing auditory information.

A communication device 1050 may also be coupled to the bus 1010. The communication device 1050 may include a modem, a transceiver, a wireless modem, or other interface device. The system 1000 may be linked to a network or to other device using via an interface 1055, which may include links to the Internet, a local area network, or another environment. The system 1000 may comprise a server that connects to multiple devices. In one embodiment the system 1000 comprises a JAVA® compatible server that is connected to user devices and to external resources.

While the machine-readable medium 1030 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1000 and that causes the machine to perform any one or more of the methodologies of the present invention. The term "machine-readable medium" shall accordingly be taken to include, but not be limited to one or more machine-readable storage medium such as: solid-state memories, optical and magnetic media, and one or more propagation medium such as: carrier wave signals.

An article of manufacture may be used to store program code. An article of manufacture that stores program code may be embodied as, but is not limited to, one or more machine-readable storage medium such as: memories (e.g., one or more flash memories, random access memories (static, dynamic or other)), optical disks, CD-ROMs, Digital Video Disk ROMs (DVD-ROMs), EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Furthermore, it is appreciated that a lesser or more equipped computer system than the example described above may be desirable for certain implementations. Therefore, the configuration of system 1000 may vary from implementation to implementation depending upon numerous factors, such as price constraints, performance requirements, technological improvements, and/or other circumstances.

It is noted that processes taught by the discussion above can be practiced within various software environments such as, for example, object-oriented and non-object-oriented programming environments, JAVA based environments (such as a JAVA 2 Enterprise Edition (J2EE) environment or environments defined by other releases of the JAVA standard), or other environments (e.g., a .NET environment, a Windows/NT environment each provided by Microsoft Corporation).

It should be noted that, while the embodiments described herein may be performed under the control of a programmed processor, such as processors 1015 through 1020, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A computer-implemented method comprising:
    obtaining trace information from local memories associated with virtual machines, the trace information including virtual machine trace information relating to the virtual machines and worker node trace information relating to worker nodes corresponding to the virtual machines;
    performing content-based filtering of the trace information obtained from the local memories such that the virtual machine trace information is separated from the worker node trace information, wherein each local memory associated with a virtual machine stores a portion of the trace information including a portion of the virtual machine trace information relating to the virtual machine and further stores a portion of the worker node trace information relating to a worker node corresponding to the virtual machine, the worker nodes and the virtual machines relating to software applications running on an application server of a computer system;
    merging the filtered worker node trace information obtained from the local memories into a single worker node trace file; and
    merging the filtered virtual machine trace information obtained from the local memories into a single virtual machine trace file.

2. The computer-implemented method of claim 1, further comprising providing access to the single virtual machine trace file and the single worker node trace file via a common trace output destination associated with a shared memory of the application server.

3. The computer-implemented method of claim 2, further comprising storing the single virtual machine trace file and the single worker node trace file at the shared memory of the application server.

4. The computer-implemented method of claim 1, wherein content-based filtering is performed based on one or more of component identities, component priorities, errors types, error patterns, and error severity levels relating to content of the trace information.

5. A system comprising:
    a server computer system having a processor and further having an application server, the application server to
    obtain trace information from local memories associated with virtual machines, the trace information including virtual machine trace information relating to the virtual machines and worker node trace information relating to worker nodes corresponding to the virtual machines;
    perform content-based filtering of the trace information obtained from the local memories such that the virtual machine trace information is separated from the worker node trace information, wherein each local memory associated with a virtual machine stores a portion of the trace information including a portion of the virtual machine trace information relating to the virtual machine and further stores a portion of the worker node trace information relating to a worker node corresponding to the virtual machine, the worker nodes and the virtual machines relating to software applications running on the application server;
    merge the filtered worker node trace information obtained from the local memories into a single worker node trace file; and
    merge the filtered virtual machine trace information obtained from the local memories into a single virtual machine trace file.

6. The system of claim 5, wherein the application server is further to provide access to the single virtual machine trace file and the single worker node trace file via a common trace output destination associated with a shared memory of the application server.

7. The system of claim 6, wherein the application server is further modified to store the single virtual machine trace file and the single worker node trace file at the shared memory of the application server.

8. The system of claim 5, wherein content-based filtering is performed based on one or more of component identities, component priorities, errors types, error patterns, and error severity levels relating to content of the trace information.

9. A machine-readable storage medium comprising instructions which, when executed, cause a machine to:
    obtain trace information from local memories associated with virtual machines, the trace information including virtual machine trace information relating to the virtual machines and worker node trace information relating to worker nodes corresponding to the virtual machines;
    perform content-based filtering of the trace information obtained from the local memories such that the virtual machine trace information is separated from the worker node trace information, wherein each local memory associated with a virtual machine stores a portion of the trace information including a portion of the virtual machine trace information relating to the virtual machine and further stores a portion of the worker node trace information relating to a worker node corresponding to the virtual machine, the worker nodes and the virtual machines relating to software applications running on an application server of a server computer system;
    merge the filtered worker node trace information obtained from the local memories into a single worker node trace file; and merge the filtered virtual machine trace information obtained from the local memories into a single virtual machine trace file.

10. The machine-readable storage medium of claim 9, wherein the instructions which, when executed, further cause the machine to provide access to the single virtual machine trace file and the single worker node trace file via a common trace output destination associated with a shared memory of the application server .

11. The machine-readable storage medium of claim 9, wherein the instructions which, when executed, further cause the machine to store the single virtual machine trace file and the single worker node trace file at the shared memory of the application server.

12. The machine-readable storage medium of claim 9, wherein content-based filtering is performed based on one or more of component identities, component priorities, errors types, error patterns, and error severity levels relating to content of the trace information.

* * * * *